US008862989B2

(12) United States Patent
Kung et al.

(10) Patent No.: US 8,862,989 B2
(45) Date of Patent: Oct. 14, 2014

(54) EXTENSIBLE INPUT METHOD EDITOR DICTIONARY

(75) Inventors: Yun-Chiang-Jordan Kung, Taipei (TW); Yu-Li Huang, Taipei (TW); Chin-Nan Lee, Taipei (TW); Hsiang-Fu Liu, Taipei (TW)

(73) Assignee: Microsoft Corporation, Redmond, WA (US)

( * ) Notice: Subject to any disclaimer, the term of this patent is extended or adjusted under 35 U.S.C. 154(b) by 1062 days.

(21) Appl. No.: 12/145,533

(22) Filed: Jun. 25, 2008

(65) Prior Publication Data

US 2009/0327313 A1    Dec. 31, 2009

(51) Int. Cl.
*G06F 17/27* (2006.01)
*G06F 17/30* (2006.01)

(52) U.S. Cl.
CPC .................................. *G06F 17/2735* (2013.01)
USPC ........... 715/264; 715/261; 715/262; 715/263; 704/10; 710/67

(58) Field of Classification Search
CPC .... G06F 3/018; G06F 3/0233; G06F 17/2223
USPC .................... 715/261, 262, 263, 264; 704/10; 345/467
See application file for complete search history.

(56) References Cited

U.S. PATENT DOCUMENTS

| 4,669,901 | A | * | 6/1987 | Feng ............................. 400/484 |
| 4,684,926 | A | * | 8/1987 | Yong-Min ....................... 341/28 |
| 5,319,552 | A | * | 6/1994 | Zhong ........................... 715/262 |
| 5,360,343 | A | * | 11/1994 | Tang ............................ 434/118 |
| 5,378,068 | A |  | 1/1995 | Hua |
| 5,555,361 | A | * | 9/1996 | Narita et al. .................. 345/168 |
| 6,003,050 | A |  | 12/1999 | Silver et al. |
| 6,282,508 | B1 | * | 8/2001 | Kimura et al. ................... 704/10 |
| 6,460,015 | B1 | * | 10/2002 | Hetherington et al. ........... 704/8 |
| 6,789,231 | B1 |  | 9/2004 | Reynar et al. |
| 6,822,585 | B1 | * | 11/2004 | Ni et al. .......................... 341/28 |
| 6,982,658 | B2 | * | 1/2006 | Guo .................................. 341/28 |
| 7,315,982 | B2 | * | 1/2008 | Becker ........................... 715/262 |
| 7,616,190 | B2 | * | 11/2009 | Li et al. ......................... 345/168 |

(Continued)

FOREIGN PATENT DOCUMENTS

EP         0971284 A1      1/2000

OTHER PUBLICATIONS

Chinese Mac (retrieved Apr. 22, 2008), pp. 1-12 http://www.yale.edu/chinesemac/pages/tcim_9.html.*

(Continued)

*Primary Examiner* — Stephen Hong
*Assistant Examiner* — Mario M Velez-Lopez
(74) *Attorney, Agent, or Firm* — Steve Crocker; Jim Ross; Micky Minhas

(57) ABSTRACT

An extensible reading system is described that provides a method of extending the readings supported by an IME application without updating the entire application. The extensible reading system separates the IME reading dictionary from the IME application, so that the user can update or supplement the dictionary with new readings without modifying the IME application. The extensible reading system receives custom readings from a user that include a sequence of keyboard characters and a selection of a language character that is to be inserted into a document when a user inputs the sequence of keyboard characters. Thus, the extensible reading system allows the user to update the readings for mapping keyboard characters to language characters much more frequently.

16 Claims, 4 Drawing Sheets

(56) References Cited

U.S. PATENT DOCUMENTS

| | | | | |
|---|---|---|---|---|
| 7,721,203 | B2* | 5/2010 | Jurion et al. | 715/256 |
| 7,840,073 | B2* | 11/2010 | Dunn | 382/185 |
| 8,032,357 | B2* | 10/2011 | Kung et al. | 704/5 |
| 8,667,412 | B2* | 3/2014 | Patryshev | 715/773 |
| 2001/0052900 | A1 | 12/2001 | Lee | |
| 2003/0055678 | A1* | 3/2003 | Nakayama et al. | 705/1 |
| 2005/0065775 | A1* | 3/2005 | Poon | 704/7 |
| 2005/0108726 | A1* | 5/2005 | Need et al. | 719/318 |
| 2005/0289481 | A1* | 12/2005 | Chang et al. | 715/825 |
| 2006/0168375 | A1* | 7/2006 | Di et al. | 710/67 |
| 2006/0282583 | A1 | 12/2006 | Kung et al. | |
| 2008/0010313 | A1* | 1/2008 | Thede | 707/102 |
| 2008/0312910 | A1* | 12/2008 | Zhang | 704/10 |
| 2009/0055381 | A1* | 2/2009 | Wu et al. | 707/5 |
| 2009/0058823 | A1* | 3/2009 | Kocienda | 345/173 |
| 2009/0157678 | A1* | 6/2009 | Turk | 707/6 |
| 2009/0225041 | A1* | 9/2009 | Kida et al. | 345/173 |
| 2010/0146386 | A1* | 6/2010 | Ma et al. | 715/261 |

OTHER PUBLICATIONS

Private Character Editor, Apr. 25, 2008, pp. 1-4 http://vlaurie.com/computers2/Articles/privchar.htm.*
Private Character Editor, Apr. 25, 2008, pp. 1-11 http://vlaurie.com/computers2/Articles/privchar.htm.*
Chinese Mac (retrieved Apr. 22, 2008), pp. 1-12 http://www.yale.edu/chinesemac/pages/tcim_9.htm.*
Adobe System Inc., Acrobat Acrobat 7.0, Sep. 23, 2005, pp. 1-3.*
Chinese Mac (MacOS9), Using the Chinese language on the Mac OS, Oct. 12, 2007, pp. 1-12 http://web.archive.org/web/20071012083842/http://www.yale.edu/chinesemac/pages/os9.htm.*
Alt Codes for Greek Letters, Oct 8, 2007, pp. 1-2 http://www.usefulshortcuts.com/alt-codes/greek-alt-codes.php.*
Chinese Mac (retrieved Apr. 22, 2008), pp. 1-12 http://www.yale.edu/chinesemac/pages/tcim_9.html.*
Chinese Mac (MacOS9), Using the Chinese language on the Mac OS, Oct. 12, 2007, pp. 1-12 http://web.archive.org/web/20071012083842/http://www.yale.edu/chinesemac/pages/os9.html.*
"Input Method Editor and Text Services Framework Accessibility", Jun. 2002. http://msdn2.microsoft.com/en-us/library/ms971336.aspx.
"Add a word to an Input Method Editor (IME) dictionary", (Retrieved Apr. 22, 2008). http://office.microsoft.com/en-us/access/HP030900421033.aspx.
"Simplified Chinese Input Method (ZIM)", (Retrieved Apr. 22, 2008). http://www-rz.uni-hohenheim.de/betriebssysteme/unix/aix/aix_4.3.3_doc/base_doc/usr/share/man/info/en_US/a_doc_lib/aixprggd/genprogc/chinese_zim.htm.
"Chinese Mac", (Retrieved Apr. 22, 2008). http://www.yale.edu/chinesemac/pages/tcim_9.html.
"Input Method Utilities", (Retrieved Apr. 22, 2008). http://docs.sun.com/app/docs/doc/817-2523/6mi69qk82?a=view.

* cited by examiner

Pinyin:

Pinyin Compounds:

Romaji:

Romaji Compounds:

EXTENSIBLE INPUT METHOD EDITOR DICTIONARY

BACKGROUND

Latin based languages (e.g., English, German, French, Spanish, and so on) are represented by the combination of a limited set of characters. Because this set is relatively small, most languages have a one-to-one correspondence of a single character in the set to a given key on a keyboard. When it comes to East Asian languages (e.g., Chinese, Japanese, Korean, and so forth) the number of characters in the language can be in the tens of thousands, which makes using a one-to-one character to keyboard key model next to impossible. To allow users to input characters for these languages, several Input Methods (IM) have been devised to create Input Method Editors (IME). An input method editor (IME) is a program or operating system component that allows computer users to enter characters and symbols not found on their keyboard using multiple keystrokes of the keys that are found on their keyboard. For example, the user can use a Western keyboard to input Chinese, Japanese, Korean, and Indic characters using multiple keystrokes. For example, although English contains 26 characters, Mandarin Chinese contains over 10,000 characters. Using only three-character sequences, an English keyboard is capable of representing 17,576 language characters ($26^3$), or more if symbol keys and/or longer key sequences are included.

An IME typically runs in conjunction with another application to provide input mapping. For example, a user running a word processing application may run the IME at the same time to input language characters into a document. Often an operating system (e.g., Microsoft Windows) or an application suite (e.g., Microsoft Office) for use with multiple application programs and document types provides the IME.

A reading refers to the mapping of a sequence of keyboard characters to a resulting language character. Many types of readings have been developed and are included with IMEs. For example, a phonetic reading system is commonly used to input Japanese Hiragana and Chinese Pinyin characters. Readings are often incomplete, meaning that some rarely used characters may not have any defined reading. For example, although there are about 70,000 Chinese characters, only 48,000 have defined readings today. It is common for new readings to be created regularly for characters that come into more frequent use, such as by governments or other organizations, that become commonly accepted. New readings may be created as new systems of representing language characters with keyboard characters are discovered. In addition, end users may want to define their own custom or non-standard readings.

Unfortunately, users are stuck with the readings that an application is programmed to understand. Governments and other entities often create new readings that cannot be used with various applications until the next version of the application adds support for the new readings. Applications may not be updated for a long amount of time, if at all. When a reading is not available, users may have to resort to more difficult methods of language character entry, such as selecting the desired language character from a large visual map of characters. This can significantly slow the user's ability to quickly enter language characters in the user's desired language.

SUMMARY

An extensible reading system is described that provides a method of extending the readings supported by an IME application without updating the entire application. The extensible reading system separates the IME reading dictionary from the IME application, so that the user can update or supplement the dictionary with new readings without modifying the IME application. The extensible reading system receives custom readings from a user that include a sequence of keyboard characters and a selection of a language character that is to be inserted into a document when a user inputs the sequence of keyboard characters. The extensible reading system stores the sequence of keyboard characters and the selected language character in an extensible IME dictionary that is updatable without updating the IME application. Later, when a user invokes an application that receives IME input, the extensible reading system loads readings from the extensible IME dictionary. As the user inputs keyboard characters, the extensible reading system determines whether the sequence of characters input by the user matches any readings defined in the dictionary. When a possible match is found, the system displays the possibly matching language characters associated with the readings to the user. Then, the system receives a selection of a language character from the user and inserts the selected character into the document that the user is editing. Thus, the extensible reading system allows the user to update the readings for mapping keyboard characters to language characters much more frequently.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An extensible reading system is described that provides a method of extending the readings supported by an IME without updating the entire application with which the IME is associated. The extensible reading system separates the IME reading dictionary from the IME application, so that the user can update or supplement the dictionary with new readings without modifying the IME application. The extensible reading system receives custom readings from a user that include a sequence of keyboard characters and a selection of a language character that is to be inserted into a document when a user inputs the sequence of keyboard characters. For example, the user may provide a sequence of three or four English characters from a Western keyboard that map to a single East Asian language character. The extensible reading system stores the sequence of keyboard characters and the selected language character in an extensible IME dictionary that is updatable without updating the IME application. For example, the system may store the dictionary in a data file separate from the IME application module. Later, when a user invokes an application that receives IME input, the extensible reading system loads readings from the extensible IME dictionary. For example, the user may invoke a word processing application that receives language characters that a user enters through an IME application.

As the user inputs keyboard characters, the extensible reading system determines whether the sequence of characters input by the user matches any readings defined in the dictionary. For example, the system may identify readings with sequences of keyboard characters that start with the characters input by the user. When a possible match is found, the system displays the possibly matching language characters associated with the readings to the user. For example, the system may provide a dialog box that displays language characters from matching readings. Then, the system receives a selection of a language character from the user and inserts the selected character into the document that the user is editing. For example, if the user invoked a word processing application, then the system inserts the selected language character into the word processing document. Thus, the extensible reading system allows the user to update the readings for mapping keyboard characters to language characters much more frequently and to add readings that the user prefers.

Figure 1:
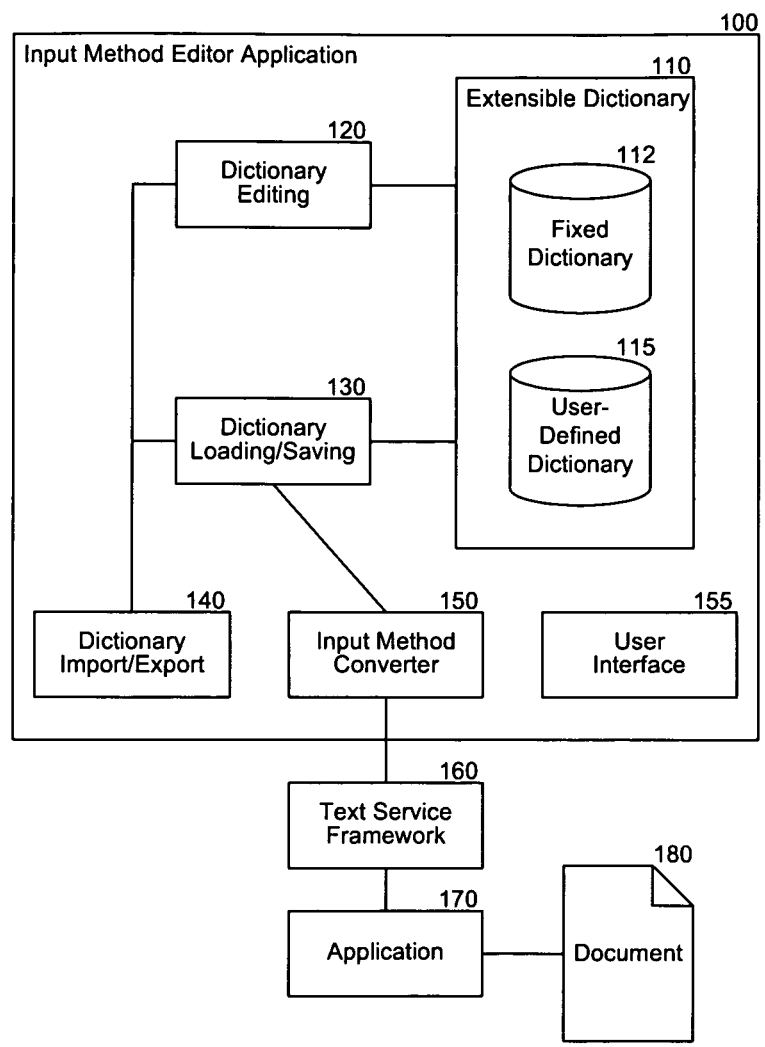
FIG. 1 is a block diagram that illustrates components of the extensible reading system, in one embodiment.

FIG. 1 is a block diagram that illustrates components of the extensible reading system, in one embodiment. The extensible reading system 100 may be part of an IME, as shown, or can be a separate component and includes an extensible dictionary 110, a dictionary editing component 120, a dictionary loading/saving component 130, a dictionary import/export component 140, an input method converter component 150, and a user interface component 155. These components are described further herein. The extensible reading system 100 typically operates in an environment having a text service framework 160 that provides a connection with one or more applications, such as application 170. The application 170 typically creates documents, such as document 180 that include language characters input using the extensible reading system 100. The text service framework 160 may be provided by an operating system or other system and communicates language characters selected using the extensible reading system 100 to the application 170. The text service framework 160 is shown as an example embodiment, and those of ordinary skill in the art will recognize that the extensible reading system 100 may interact with applications directory or even be a subcomponent of application 170.

The extensible dictionary 110 provides storage for readings between sessions of using the extensible reading system 100. The extensible dictionary 110 may include separate components such as a fixed dictionary 112 and a user-defined dictionary 115, or all readings may be stored together. The fixed dictionary 112 contains static readings that are provided with the extensible reading system 100 from the manufacturer, whereas the user-defined dictionary 115 contains dynamic readings added later by an end-user, system administrator of an organization, and so on. The extensible dictionary 110 contains mappings that specify conversions between one or more keyboard character sequences to one or more language characters. The extensible dictionary 110 may also contain readings that map a sequence of keyboard characters into multiple language characters, called compounds.

The dictionary editing component 120 provides functions for adding and removing readings from the extensible dictionary 110. As readings become less used, new readings become more used, or a user develops preferences for particular readings, the user may interact with through the user interface component 155 with the dictionary editing component 120 to update the extensible dictionary 110 based on the user's preferences. Organizations may also publish standard readings for use in the organization that a system administrator loads through the dictionary editing component 120 to update the extensible dictionary 110. In this way, the extensible dictionary 110 can stay up to date even if the manufacturer rarely updates the IME application.

The dictionary loading/saving component 130 loads the contents of the extensible dictionary 110 for use by applications, such as application 170, and saves changes to the dictionary, such as new readings. The dictionary loading/saving component 130 may create indexes and other data structures typically used in the art for quickly accessing tables of data. The dictionary loading/saving component 130 provides access to the extensible dictionary 110 to other components of the system 100, such as the input method converter component 150. The dictionary loading/saving component 130 may also work with the dictionary import/export component 140 to enumerate the entries in the extensible dictionary 110 for export to a file or other applications.

The dictionary import/export component 140 provides a way of extracting readings from or adding readings to the extensible dictionary 110 in bulk. For example, a user that has developed extensive custom readings may want to export those readings for distribution to other users or for backup to protect the readings against data loss if the system storing the extensible dictionary 110 has a data loss event. A user may also receive readings from the government, from organizations, or from other users that the user wants to import into the user's local extensible dictionary 110 so that the user can use the readings. The dictionary import/export component 140 may provide many different methods of importing and exporting readings, such as via an extensible markup language (XML) or other type of file, upload to or download from a website or other public server, and so forth.

In many cases, users may want to share custom readings they have defined or found from other users. The dictionary import/export component 140 provides a way of extracting the custom readings from a particular dictionary and sharing the readings with others. The dictionary import/export component 140 also provides a way to load custom readings received from other users. For example, an organization, such as a company or department within a company, may load a standard set of readings for use on computers administered by the organization.

In some embodiments, the extensible reading system stores the readings imported and exported by the import/export component in a plaintext file. Users can read or edit a plaintext file using a basic text editing application. For example, the readings may be stored in a text (.TXT) file editable by Microsoft Notepad, a comma-separated values (.CSV) file editable by Microsoft Excel, or in an XML file that can be viewed using Microsoft Internet Explorer. Making the reading files easy to edit encourages users to add new readings that they find convenient for entering language characters.

The input method converter component 150 uses the readings defined in the extensible dictionary 110 to convert keyboard characters input by a user into language characters based on the readings. The input method converter component 150 may provide a variety of different input methods based on the readings. For example, as a user types keyboard characters, the input method converter component 150 may determine all of the readings that possibly match the typed characters. The input method converter component 150 may treat the typed characters as partial matches with the beginnings of sequences of characters in the extensible dictionary 110. For example, if the extensible dictionary 110 contains readings for the sequences of characters "ka" and "kan," then after the user types "ka" the input method converter component 150 may display both readings and allow the user to choose which one is associated with the language character that the user is looking for. The input method converter component 150 may also accept wildcard characters (e.g., "*") that server as placeholders for one or more characters in the extensible dictionary 110. As the user inputs further characters, the list of possible matches decreases until the user has a small enough list of choices that the user can find the language character he/she is looking for.

The user interface component 155 provides an interface with the user for each of the functions described above. For example, the user interface component 155 may provide an interface for entering characters and receiving matches from the input method converter component component 150. The user interface component 155 may also provide an interface for managing the extensible dictionary 110 using the dictionary editing component 120 and dictionary import/export component 140. The user interface component 155 may provide a traditional graphical user interface, a web-based user interface, a console interface, or other suitable method of interacting with the user. The user interface component 155 may also expose one or more application programming interfaces (APIs) for other applications to enhance the functionality of the extensible reading system 100.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
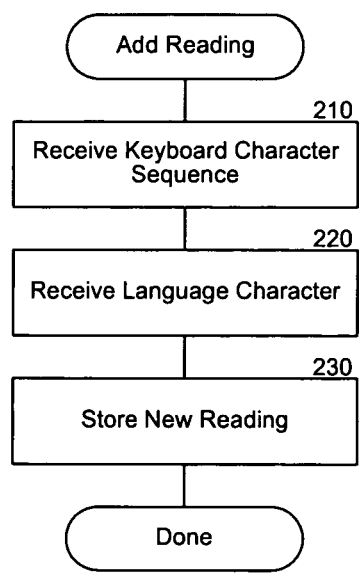
FIG. 2 is a flow diagram that illustrates processing of the dictionary editing component to add new readings, in one embodiment.

FIG. 2 is a flow diagram that illustrates processing of the dictionary editing component to add new readings, in one embodiment. In block 210, the component receives a sequence of keyboard characters for the new reading. For example, the user may input the sequence of keyboard characters using a physical or virtual keyboard, or the sequence of characters may be loaded from a file or other storage device. In block 220, the component receives a selection of a language character that is to be inserted into a document when a user inputs the sequence of keyboard characters. For example, the language character may be selected from a graphical table of language characters or the user may provide a Unicode character identifier that identifies the language character. In block 230, the component stores the sequence of keyboard characters and the selected language character in an extensible input method editor dictionary. For example, the dictionary may be stored in a file or database accessible by an input method editor application. The dictionary is user-updatable without updating the input method editor application. When a user later enters the sequence of keyboard characters in an application, the component will insert the language character defined by the reading. After block 230, these steps conclude.

Figure 3:
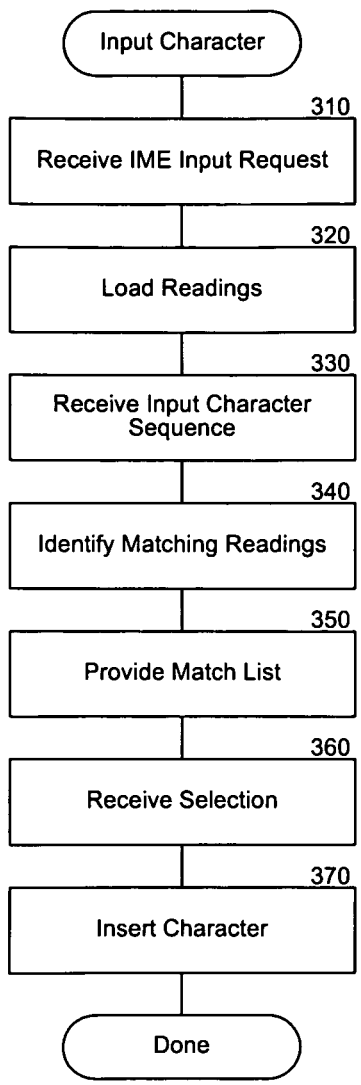
FIG. 3 is a flow diagram that illustrates process of the input method component to select a language character for insertion into a document, in one embodiment.

FIG. 3 is a flow diagram that illustrates process of the input method component to select a language character for insertion into a document, in one embodiment. In block 310, the component receives a request to direct input to an application through an input method editor for converting keyboard characters to language characters. For example, Microsoft Windows displays an IME icon in the taskbar through which users can select IME input for applications. In block 320, the component loads readings that map keyboard characters to language characters from an extensible dictionary that contains readings provided by an end user. For example, the dictionary may be stored in a file and the component loads the readings from the file. The readings may include both static readings defined by the IME application and dynamic readings defined by an end user. In block 330, the component receives a sequence of keyboard characters input to the application. For example, an application user may type the characters into a window associated with the application or a window provided by the IME application. In block 340, the component determines whether the input sequence of keyboard characters matches a sequence of keyboard characters associated with a reading in the extensible dictionary. For example, the component may perform full or partial string matching on the input sequence of characters and the character sequences in the dictionary. The component may look separately in a fixed dictionary and an end-user dictionary to find matching readings.

In block 350, the component provides to the application user a list of one or more language characters associated with one or more readings that have matching sequences of keyboard characters. For example, the component may display a graphical drop down list visually depicting the possible language character matches. The list may include language characters from both static and dynamic readings. In block 360, the component receives from the application user a selection of a particular language character from the list. For example, the application user may click on the selection with a mouse or other cursor. In block 370, the component inserts the selected language character into the document. The component may optionally loop to block 330 to receive additional character sequences. After block 370, these steps conclude.

Figure 4:
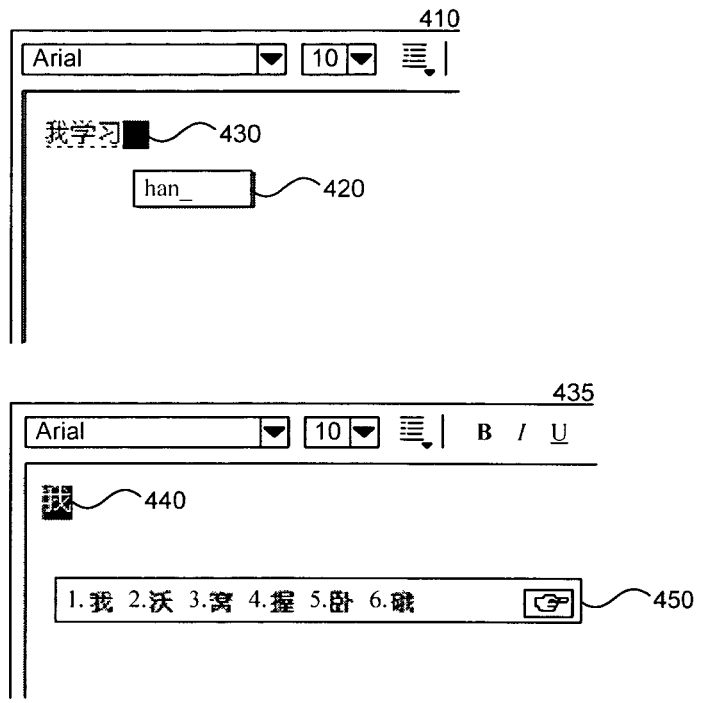
FIG. 4 illustrates several example displays provided by the user interface component to interact with a user, in one embodiment.

FIG. 4 illustrates several example displays provided by the user interface component to interact with a user, in one embodiment. The first display 410 illustrates typing keyboard characters into an IME application. The characters are displayed in a box 420 as well as phonetically matching characters 430. When the user is finished typing keyboard characters, the user hits the space bar or provides another indication specified by the IME application. The IME application then displays the display 435, which converts the keyboard characters entered by the user using the dictionary of readings into the most likely matching language character 440. If the matching language character is ambiguous, such as when there are multiple matching readings, then the component may display a list 450 from which the user can choose other matching language characters.

The display 460 illustrates an example entry "ni" using the Chinese Pinyin system. Pinyin is the official Romanization system for Mandarin Chinese. It was promulgated in 1958 and has been a United Nations standard since 1977. The display 470 illustrates Pinyin compounds that may be accepted by the IME. When the IME accepts compounds, the keyboard characters entered by the user are matched with multiple language characters in the dictionary (in this case "ni" and "hao"). The display 480 illustrates a similar process using Romaji. Romaji is the Romanization of Japanese characters. A user types the pronunciation of a word in Hepburn (or other) Romanization and selects the appropriate language character. For example, display 480 illustrates the language characters with matching readings for the keyboard character sequence "go." The display 490 illustrates Romaji compounds where the sequences "ni," "hon," and "go" are each matched to separate language characters. Compounds relieve the user from having to perform the character selection process after entering each keyboard sequence, and thus can save time.

In some embodiments, the extensible reading system limits the number of custom readings to enhance performance. Static readings provided by the IME application can be optimized in various ways (such as by ordering the table of keyboard character sequences based on frequency of use or creating indexes into the keyboard character sequences) that are more difficult for custom or dynamic readings. As the number of custom readings increases, the time to look up readings when a user inputs a sequence of characters may also increase. Thus, the system may limit the number of custom readings that the user can define to manage the performance of the system. The limit may be based on a predefined number (e.g., 15) or may be determined dynamically, such as based on the resources (e.g., processing power) available on the user's computer. When a user reaches the limit, the system may inform the user to remove some readings or may automatically remove the least frequently used reading from the dictionary.

In some embodiments, the extensible reading system creates an identifier from the sequence of keyboard characters associated with a reading. For example, the system may use the ASCII or Unicode character code associated with a keyboard character to create an identifier for the sequence of characters. The identifier can be used to speed the look up of readings. When a user enters a sequence of keyboard characters to identify matching language characters, the system determines the identifier associated with the entered sequence of characters and queries the dictionary for a matching identifier. If the system finds a matching identifier, then the system uses the associated reading to retrieve the language character associated with the reading.

In some embodiments, the extensible reading system looks for matching readings while the user is still typing the input sequence of characters. As the user types each keyboard character, the system may display a list of likely matches for the keyboard characters typed up to that point. As the user enters more keyboard characters, the number of possible matching language characters in the list becomes smaller until the list is refined enough for the user to identify and select the desired language character. For readings with few other similar readings, this may save the user several keystrokes as the desired language character may be displayed before the user has entered all of the keyboard characters associated with the readings.

In some embodiments, the extensible reading system receives custom readings for compounds. As discussed herein, compounds are sequences of keyboard characters that map to multiple language characters, and can be created automatically by combining defined readings for multiple sequences of keyboard characters. For example, if the dictionary contains readings for the keyboard sequences "ni" and "hao" each with a single associated language character, then the dictionary may provide both language characters for the compound keyboard sequence "nihao." The system can determine how to divide the keyboard sequence in many different ways. For example, the system may exhaustively try to identify matching readings for all permutations of the keyboard sequence, or the system may store more in-depth knowledge about common sequences of characters to determine how to divide the keyboard sequence heuristically.

In some embodiments, the extensible reading system provides bi-directional lookup of readings. For example, a user may provide a language character, such as by pasting it from the operating system clipboard, entering a known reading, or selecting it from a visual map and the system will return a list of readings for specifying that language character. This can allow the user to learn about other readings for a language character that the user uses frequently, so that the user can use the reading when entering the language character in the future.

From the foregoing, it will be appreciated that specific embodiments of the extensible reading system have been described herein for purposes of illustration, but that various modifications may be made without deviating from the spirit and scope of the invention. For example, although languages have been described, the methods described herein would be suitable for identifying an option out of any large set of options using sequences of available inputs. As an example, a clip art library could be mapped to sequences of keys for selecting popular clip art. Those of ordinary skill in the art will recognize these and many other possible variations. Accordingly, the invention is not limited except as by the appended claims.

We claim:

1. A method performed by a computer having a processor and a keyboard with a plurality of keys each corresponding to a keyboard character of a first language, the method comprising:

receiving, by the processor, a sequence of keyboard characters of the first language from the corresponding keys on the keyboard to an input method editor ("IME") component, wherein the received sequence of keyboard characters include English characters;

receiving, by the processor, an input of a single text character to the IME component, the single text character being of a second language different than the first language and without a corresponding sequence of the keyboard characters of the first language in the IME component wherein the single text character is a character of at least one of Chinese, Japanese, Korean, or Indic;

subsequently, defining, by the processor, a custom reading for the second language by mapping the received sequence of the keyboard characters of the first language to the received single text character of the second language;

determining if a number of custom readings associated with the IME component is above a threshold; and in response to determining that the number of custom readings is not above the threshold, storing, by the processor, the custom reading having the mapped sequence of the keyboard characters of the first language and the single text character of the second language in a dictionary accessible by the IME component, the stored custom reading being accessible to insert the single text character in a document in response to receiving the sequence of keyboard characters from the keyboard.

2. The method of claim 1 wherein the received single text character of the second language does not have a one-to-one correspondence with one of the keys of the keyboard.

3. The method of claim 1 further comprising, receiving a request to export reading from the dictionary and exporting the reading to a file.

4. The method of claim 1 further comprising loading the dictionary in an input method editor application, receiving the sequence of keyboard characters, and in response to receiving the sequence of keyboard characters, inserting the single text character into a document.

5. The method of claim 1 further comprising, before storing the reading, determining if a limit of readings has been reached in the dictionary, and in response to that the limit has been reached, displaying a warning to the user that the reading cannot be stored.

6. The method of claim 1 further comprising, before storing the reading, determining if a limit of readings has been reached, and in response to that the limit has been reached, prompting the user to remove a reading from the dictionary.

7. The method of claim 1 wherein storing the sequence of keyboard characters comprises creating an identifier for the sequence of keyboard characters based on character codes associated with each of the keyboard characters in the sequence.

8. A method performed by a computer having a processor and a keyboard with a plurality of keys each corresponding to an English character, the method comprising:
receiving, by the processor, a sequence of English characters from the corresponding keys on the keyboard to an input method editor ("IME") application;
receiving, by the processor, an input of a single text character of a language different than English to the IME application, wherein the single text character does not have a one-to-one correspondence with one of the keys of the keyboard or with a sequence of keys of the keyboard wherein the single text character is a character of at least one of Chinese, Japanese, Korean, or Indic;
subsequently, defining, by the processor, a custom reading for the language by mapping the received sequence of the English characters to the received single text character of the language different than English;
determining if a number of custom readings associated with the IME application is above a threshold; and
in response to determining that the number of custom readings is not above the threshold, storing, by the processor, the custom reading having the mapped sequence of the English characters and the single text character of the language different than English in a dictionary accessible by the IME application, the stored custom reading being accessible to convert a sequence of English characters to the single text character in response to receiving the sequence of the English characters from the keyboard without updating the IME application.

9. The method of claim 8 wherein receiving, by the processor, the input of the single text character includes receiving a selection of the single text character from a graphical table or a Unicode character identifier.

10. The method of claim 8 wherein:
the sequence is a first sequence;
the single text character is a single text character;
the reading is a first reading;
the method further includes:
receiving, by the processor, a second sequence of English characters from the corresponding keys on the keyboard;
receiving, by the processor, an input of a second single text character of the language different than English; and
defining, by the processor, a second reading for the language by mapping the received second sequence of the English characters to the received second single text character of the language different than English.

11. The method of claim 10, further comprising combining the first and second readings to create a compound reading that corresponds to multiple sequences of English characters.

12. A computing system, comprising:
a processor and a memory containing instructions that when executed by the processor, cause the processor perform a method comprising:
receiving a sequence of English characters from the corresponding keys on the keyboard to an input method editor ("IME") application;
receiving an input of a single text character of a language different than English to the IME application, wherein the single text character does not have a one-to-one correspondence with one of the keys of the keyboard or with a sequence of keys of the keyboard, wherein the single text character is a character of at least one of Chinese, Japanese, Korean, or Indic;
subsequently, defining a custom reading for the language by mapping the received sequence of the English characters to the received single text character of the language different than English;
determining if a number of custom readings associated with the IME application is above a threshold; and
in response to determining that the number of custom readings is not above the threshold, storing the custom reading having the mapped sequence of the English characters and the single text character of the language different than English in a dictionary accessible by the IME application, the stored custom reading being accessible to convert a sequence of English characters to the single text character in response to receiving the sequence of the English characters from the keyboard without updating the IME application.

13. The computing system of claim 12 wherein receiving the input of the single text character includes receiving a selection of the single text character from a graphical table.

14. The computing system of claim 12 wherein receiving the input of the single text character includes receiving a selection of the single text character from a Unicode character identifier.

15. The computing system of claim 12 wherein:
the sequence is a first sequence;
the single text character is a single text character;
the custom reading is a first custom reading;
the method performed by the processor further includes:
receiving a second sequence of English characters from the corresponding keys on the keyboard;
receiving an input of a second single text character of the language different than English; and
defining a second custom reading for the language by mapping the received second sequence of the English characters to the received second single text character of the language different than English.

16. The computing system of claim 12 wherein the method performed by the processor further includes combining the first and second readings to create a compound reading that corresponds to multiple sequences of English characters.

\* \* \* \* \*